UNITED STATES PATENT OFFICE.

WILLIAM LAWRENCE AUSTIN, OF DENVER, COLORADO.

METHOD OF SMELTING.

SPECIFICATION forming part of Letters Patent No. 527,312, dated October 9, 1894.

Application filed April 2, 1894. Serial No. 506,087. (No specimens.)

*To all whom it may concern:*

Be it known that I, WILLIAM LAWRENCE AUSTIN, of Denver, in the county of Arapahoe, and in the State of Colorado, have invented a certain new and useful Method of Smelting; and I do hereby declare that the following is a full, clear, and exact description thereof.

My invention relates to the smelting of the various combinations of iron, copper, nickel, zinc and other metals, both natural and artificial, on the one side; and metalloids or non-metals, such as sulphur, arsenic and antimony, on the other side, and is equally applicable whether the elements are combined in pairs or exist in more complex forms.

The object of my invention is to provide means whereby pyrites, sulphides, arsenide or antimonide compounds, zinc-blende and other ores of an approximate chemical nature may be easily and cheaply smelted, and more especially to permit of their being smelted in a blast furnace, with the necessary fluxes and without the use of coke or charcoal in the charge, just as the ores are taken from the mine, or the furnace products are drawn from the furnace, without undergoing any preparatory treatment; and to such end, my said invention consists in the method and sub-methods substantially as and for the purpose hereinafter specified.

In the carrying of my invention into practice, I make use of the fuel qualities of the natural or artificial sulphides, arsenides and antimonides by subjecting them to a rapid oxidation, thereby generating the heat necessary to carry on a smelting operation, and then I introduce into the furnace through the apertures provided for the tuyeres, such carbonaceous materials as fuel-oils, producer-gas, or other combustible gases of any kind, or powdered fuels, and burn the same in order to produce and maintain a zone of reducing gases immediately in front of the tuyeres, thereby preventing the formation of accretions consisting largely of ferric oxide or zinc compounds, and at the same time assisting in maintaining the temperature necessary for the dissociation of the sulphides, &c., contained in the charge, and I then mix with the ore charge a certain quantity of lime-stone in lump form which prevents the sulphides, &c., from fusing together, in which latter case they form a cake and block the furnace.

I am aware that attempts have been made to introduce combustibles into furnaces through their tuyeres; but this has been done invariably for purposes wholly differing from the objects I aim to attain, and in the treatment of entirely different species of ores. I apply combustibles brought into the tuyere zone of the furnace through the tuyeres, not for the direct purpose of melting the ores or of economizing on fuels ordinarily mixed with the furnace charges; but for the two-fold object, firstly, of preventing the formation of ferric oxide or zinc compounds by providing a reducing atmosphere in front of the tuyeres, as ferric oxide and other obstructions are invariably produced when a blast-furnace is operated under any of the present systems of treating sulphide ores using more or less fuel with the charge or none at all as the case may be, and when so formed give much trouble; and, secondly, of producing a steady heat wholly under control, which temperature it is necessary to maintain in order that the sulphides, &c., contained in the ore may be so prepared that their elements can combine with the oxygen of the air blast, without which provision this is impossible to accomplish so as to produce a continuous smelting operation. I provide in this way a semi-reducing or wholly reducing atmosphere in front of the tuyeres which enables the furnace to be operated by the combustion of the natural and artificial sulphides without using carbonaceous fuels, such as coke and charcoal.

I claim as an essential part of my invention the use of a reducing atmosphere in the immediate vicinity of the tuyeres, produced in the manner indicated and for the purposes specified, when smelting sulphide ores, without the use of coke, coal or charcoal in the furnace charge.

I am also aware that limestone is a common component of furnace charges; but it is invariably used for fluxing purposes; whereas in smelting sulphides, &c., in the manner indicated herein, limestone is manifestly not employed as a flux, for the charge is already very basic, and therefore, if used at all, it will be for a different object. I use limestone, in my method of smelting, for the purpose of preventing by its inherent qualities, the premature running together of the whole charge, which, when it occurs, prevents the regular and continuous operation of the furnace. In ordinary smelting operations, where from twelve to fifty per cent. of coke, charcoal or coal are used for heat generating purposes, this large amount of infusible but combustible material in the charge, in burning away leaves the latter porous and loose, so that the whole can move forward as fast as consumed; but when sulphides, &c., are used to replace carbonaceous fuel in the charge, the whole mass is apt to assume a pasty state (due to the great fusibility of the sulphides before the smelting zone is reached) and this premature softening causes the formation of bridges or obstructions which interfere with the regular operation of the furnace. To prevent this it is necessary to introduce with the charge some material which is in itself infusible and at the same time will not readily combine *per se* chemically with the sulphide of iron, or the products of its combustion. Limestone is particularly well adapted to this purpose; for upon heating, it first swells, losing its carbonic acid which amounts to nearly half its weight, and then does not soften but remains crumbly and porous; affording a passage for the blast and products of combustion. This use of limestone for the purpose stated, in the smelting of sulphide ores, is new; and I claim as an essential feature of my method of smelting, this application of an infusible body for the prevention of a premature fusing together of a furnace charge, consisting wholly or in part of sulphides, &c. The combination of these two features, when smelting sulphide ores without coke or charcoal, that is,—the production of a reducing atmosphere in front of the tuyeres, brought about by reducing gases, &c., supplied from an outside source through the tuyeres and therefore perfectly under control; and the use of an infusible mineral ingredient such as lime stone, in the charge, whereby the whole may be kept from fusing together and thereby blocking the furnace, renders it possible to maintain a uniform smelting operation in a blast-furnace, using sulphides as fuel, and constitutes a new and useful method of ore reduction, differing in all of its essential features from any system of pyritic smelting heretofore introduced.

I have discovered that sulphide of iron and similar compounds (without being first melted or collected in a bath, as in the Hollway process) can be burned in a current of air; and when so burned, can be made to yield a sufficiently high temperature to enable one to carry on a smelting operation. To produce these results, the sulphide of iron must be rapidly burned in a suitable apparatus, and suitable flux provided for immediately combining with the protoxide of iron as soon as formed; otherwise no smelting takes place; but the result is a roasting process, entailing the production of ferric oxide. In order to produce a rapid burning of the sulphide of iron, a swift current of air is essential (which is best obtained by employing the blast of an ordinary blowing engine); and the most convenient form of apparatus for carrying on the operation is the ordinary blast furnace. To accomplish the union of the sulphide of iron with the oxygen of the air under such conditions, both must be brought up to a certain degree of temperature. Unless this is done, the smelting cannot be made continuous; for, as stated above, ferric oxide results instead of the desired ferrous salt. Various methods of accomplishing this purpose have been suggested or attempted from time to time. Vessels built on the converter principle have been used, a bath of molten sulphides being first introduced, and an air-blast then forced through said bath. This system of ore smelting (adopted by Hollway and others), admitted of preheating both the air and fuel; but it carries with it such manifest disadvantages, that it has never been put into continuous, commercial operation. It has also been attempted by other inventors to produce the desired conditions, by preheating the air of the blast used in outside heating apparatus, as in iron smelting; but this method did not fulfill the expectations raised; for the blast being rendered intensely oxidizing, the formation of accretions in the hearth of the furnace begins at once and causes various irregularities in the running of the furnace; while the most essential feature—namely,—the heat of the smelting zone, is nowise under control; the tuyeres and lower part of the furnace usually becoming black and clogged soon after coke is omitted from the ore charge.

The best method of raising the sulphide of iron, together with the oxygen to be used in its combustion, to the required temperature, is to heat the tuyere zone of the furnace from an outside source, by means of combustible gases, oils or solids, and then cause the sulphides and air to meet in the presence of the temperature created, and in the manner indicated. When these conditions are fulfilled, a continuous smelting operation can be carried on, using the heating qualities of sulphides, &c., instead of those of coke, &c. One of the essential reasons for the maintenance of a continuous and even temperature before the tuyeres (which is only possible by introducing carbonaceous combustibles when sulphides are used as fuels) is, that whereas either iron or sulphur will burn readily in the air, when in a fine state of division, in the sulphide of iron these elements are combined together, and to be burned they must first be dissociated; and for this dissociation a certain temperature is necessary. When the aforesaid iron and sulphur have been dissociated and burned, the latter is converted into sulphurous acid, but the former will burn first to ferrous oxide, and then to ferric oxide—an infusible compound—unless a high and unvarying temperature is maintained, enabling it to unite with the silica contained in the charge and form the fusible silicate of protoxide of iron. Therefore, it is a vital necessity to have the temperature of the smelting zone of the furnace under perfect control. This, in the case of smelting sulphides without the use of coke, &c., can best be accomplished by the introduction of combustibles through the tuyeres in the manner indicated; and this is furthermore the only means of preventing the formation of infusible, ferric oxide in the furnace, as well as of avoiding the collection of refractory zinc accretions in the lower parts of that apparatus. When these obstructions once begin forming, they soon collect in such masses as to speedily stop the proper working of the furnace, unless removed; and they cannot be removed, while the furnace is in operation, in any other way than by reducing gases. To correct such irregularities is one of the main objects of this invention.

By introducing combustibles through the tuyeres for the purposes indicated, the temperature of the smelting zone is always under perfect control, and therefore can be maintained at any required degree; for it is possible to admit more or less fuel-oil, gas, &c., to meet the requirements of the moment. Heretofore in order to utilize the sulphide of iron as fuel in a blast-furnace, it has always been found necessary to use more or less coke, and employ large furnaces, the presence of large masses of molten material being essential to tide over the irregularities and difficulties which arise in all of the systems of pyritic smelting heretofore introduced; but with this new method, as herein explained, where the temperature of the smelting zone is perfectly under control and no ferric or zinc oxides can accumulate in the hearth of the furnace, furnaces of any size whatever can be employed for the purpose, which greatly extends the field of utility of this method of ore-reduction.

In carrying out my method of smelting, I make use of furnaces similar in general design to those in ordinary use; consisting of a shaft, into which the ore is fed, and of a crucible for collecting the molten products. Almost any blast-furnace, now used for treating copper ores, can be adapted to this method of smelting. I begin the operation by "blowing in" the furnace in the ordinary way employed in starting up a lead or copper stack-furnace, and after it is in regular operation, the normal charge (containing preferably no carbonaceous fuel) is introduced. The charge contains from fifty to seventy per cent. of sulphide of iron, with sufficient silicious and other earthy material to form a fluid slag with the ferrous oxide resulting from the combustion of the iron sulphide, and enough limestone to prevent the charge from sticking together when the sulphides begin to soften. As in every instance the ores vary, the proper relative proportions of the constituents of the charge are determined in each case by experiment, but a mixture of sixty per cent. iron-sulphides, fifteen per cent. limestone, and twenty per cent. quartz, gives good results. The ores and fluxes are introduced into the furnace at the top of the shaft, using for this purpose a bell and hopper, or an open top, as circumstances require. The fuel-oil, gas, or whatever combustible is used for producing the requisite, reducing atmosphere of the tuyere zone, is supplied to the furnace by suitable pipes introduced through the tuyere openings, or other apertures in the furnace, and by regulating the supply of gas, &c., a reducing, semi-reducing, or oxidizing atmosphere is maintained, as required by the condition of the charge. To keep the charge out of contact with and thus prevent it sticking to the furnace wall, I interpose between the wall and charge a layer of quartzose, or silicious material that is less fusible than said charge. Such material retains its granular nature, and hence is further advantageous in that, through the interstices thereof, a pasage is provided for the upward flow of the gases and products of combustion from the zone of fusion. The slag and matte, produced in the smelting of the ores, are allowed to collect in a crucible at the bottom of the shaft, in the usual way practiced by copper or lead smelters, where they separate according to their specific gravity, and are either tapped off at intervals, or allowed to run out of the furnace continuously, in the usual way.

While I have described limestone as being used to prevent the premature fusing or running together of the charge, I also contemplate the use of dolomite, and lime in other forms; and hence regard the scope of my invention as including these, and as well, other materials which will operate to produce the same effect.

Having thus described my invention, what I claim is—

1. In the art of smelting pyrites, sulphides, arsenide or antimonide compounds, zinc-blende and other ores, or artificial furnace products of a like chemical nature, the method of securing continuous combustion and smelting without the continued use of coke, charcoal, or coal, in the charge, which consists in first heating the lower part of a charge containing one or more of these substances or compounds, together with the necessary fluxes, up to a point where combustion can take place, and then continuously maintaining the temperature of the tuyere zone at such point by the introduction into the furnace thereat, of a combustible material, substantially as and for the purpose specified.

2. In the art of smelting pyrites, sulphides, arsenide or antimonide compounds, zinc-blende and other ores, or artificial furnace products of a like chemical nature, the method of securing continued combustion and smelting without the continued use of carbonaceous fuel in the charge, which consists in first heating the lower part of a charge up to a point where combustion can take place, and then subjecting the charge to the action of an air blast while continuously maintaining the temperature of the tuyere zone at the desired point by introducing combustible material into the furnace through the tuyeres, substantially as and for the purpose shown.

3. In the art of smelting pyrites, sulphides, arsenide or antimonide compounds, zinc-blende, and other ores or artificial furnace products of a like chemical nature, the method of securing combustion and smelting without the use of carbonaceous fuel in the charge, which consists in introducing into the body of a heated furnace such compounds or ores mixed with a material, as limestone, for preventing premature fusion of the charge, and in producing and maintaining at or near the zone of fusion a predetermined temperature by the burning of combustibles introduced into the furnace at such point, substantially as and for the purpose set forth.

4. In the art of smelting pyrites, sulphides, arsenide or antimonide compounds, zinc-blende and other ores, or artificial furnace products of a like chemical nature, the method of keeping up the combustion and smelting without the use of carbonaceous fuel in the charge, which consists in introducing such compounds or ores, mixed with limestone, into the body of a heated furnace, and there subjecting them to the action of an air-blast; at the same time producing and maintaining, at or near the zone of fusion, an atmosphere consisting largely of reducing gases, formed from combustible materials introduced through the tuyeres, substantially as and for the purpose specified.

5. In the art of smelting pyrites, sulphides, arsenide or antimonide compounds, zinc-blende and other ores, or artificial furnace products of a like chemical nature, the method of keeping up the combustion and smelting without carbonaceous fuel in the charge, which consists in feeding such ores, mixed with limestone, down in a column within a heated furnace; keeping such column out of contact with the furnace walls as it passes down toward the zone of fusion, and subjecting the charge to a blast of air; all the while producing and maintaining, in the smelting zone, a temperature high enough to effect the dissociation of the metallic and non-metallic elements in the charge by burning in that part of the furnace carbonaceous gases, substantially as and for the purpose shown.

6. In the art of smelting pyrites, sulphides, arsenide or antimonide compounds, zinc-blende and other ores, or artificial furnace products of a similar chemical nature, the method of keeping up the combustion and smelting without carbonaceous fuel in the charge; which consists in feeding them, mixed with limestone, in a central column, down within a heated furnace; feeding in around such column, so as to form a layer in contact with the same entirely surrounding it and keeping it out of contact with the furnace walls, as it descends toward the zone of fusion, a not easily fused material, (other than carbonaceous fuel) which will remain unfused until it comes to or near the zone of fusion; subjecting the charge to an air blast and continuously producing and maintaining a reducing atmosphere, within the tuyere zone, by burning, in that part of the furnace, carbonaceous gases resulting from the combustion of material introduced through the tuyeres, substantially as and for the purpose described.

7. In the art of smelting pyrites, sulphides, arsenide or antimonide compounds, zinc-blende and other ores, or artificial furnace products of a like chemical nature, the method of keeping up the combustion and smelting without carbonaceous fuel in the charge; which consists in mixing with them a certain proportion of material as limestone (sufficient to prevent their premature fusing together and forming a solid mass) and feeding the mixture down within a heated furnace, keeping it from contact with the furnace walls by a layer of not readily fused material; subjecting the charge to an air-blast, and continuously maintaining a reducing atmosphere in the tuyere zone, by burning in that part of the furnace carbonaceous gases resulting from the combustion of material introduced through the tuyeres, substantially as and for the purpose specified.

8. In the art of smelting pyrites, sulphides, arsenide or antimonide compounds, zinc-blende and other ores, or artificial furnace products of a like chemical nature, the method of keeping up the combustion and smelting without carbonaceous fuel in the charge, which consists in feeding them mixed with a material, as limestone to prevent premature fusion of the charge possessing similar qualities, in requisite proportion, down into a heated furnace; while producing and maintaining a reducing atmosphere immediately in front of the tuyeres of the furnace, by burning there carbonaceous material, introduced through the said tuyeres, and subjecting the charge to an air-blast, substantially as and for the purpose described.

9. In the art of smelting pyrites, sulphides, arsenide or antimonide compounds, zinc-blende and other ores, or artificial furnace products of a like chemical nature, the method of keeping up the combustion and smelting without carbonaceous fuel in the charge, which consists in producing and maintaining a reducing zone in front of the tuyeres of a furnace, by introducing and burning carbonaceous material through the said tuyeres; at the same time producing by the same means a high enough temperature to dissociate the metallic and non-metallic compounds of the charge, so that they may be burned by the oxygen of an air current, and subjecting the charge to an air-blast, substantially as and for the purpose described.

10. In the art of smelting pyrites, sulphides, arsenide or antimonide compounds, zinc-blende and other ores, or artificial furnace products of a like chemical nature, the method of keeping up the combustion and smelting without carbonaceous fuel in the charge, which consists in producing and maintaining, in the smelting zone of the furnace, a temperature sufficient to dissociate their metallic and non-metallic contents, by burning carbonaceous material introduced through the tuyeres, and mixing with these ores, &c., a material as limestone to prevent their premature fusing and sticking together before reaching the smelting zone; and feeding this mixture down into the heated furnace and subjecting the charge to an air-blast, substantially as and for the purpose specified.

11. In the art of smelting pyrites, sulphides, arsenide or antimonide compounds, zinc-blende and other ores or artificial furnace products of a like chemical nature, the method of keeping up the combustion and smelting without carbonaceous fuel in the charge; which consists in introducing such compounds or ores down in a column within a heated furnace; keeping such column out of contact with the furnace walls, as it passes down toward the zone of fusion, by a layer which contains granular quartzose material (other than carbonaceous fuel), less fusible than the ores in said column, and subjecting the charge to a blast of air; all the while producing and maintaining in the smelting zone a temperature sufficient to dissociate the metallic and non-metallic elements of these ores and compounds; and at the same time producing and maintaining a reducing atmosphere before the tuyeres, substantially as and for the purpose shown.

12. In the art of smelting pyrites, sulphides, arsenide or antimonide compounds, zinc-blende and other ores or artificial furnace products, of a like chemical nature, the method of keeping up the combustion and smelting without carbonaceous fuel in the charge; which consists in mixing such ores and compounds with lime, or similar material, to preclude their sticking together before the smelting zone is reached; and feeding the mixture down into a heated furnace; introducing carbonaceous material through the tuyeres and burning it, so as to produce a reducing atmosphere in the neighborhood of said tuyeres; at the same time maintaining a constant temperature, through the combustion of such carbonaceous material, introduced in the manner aforesaid, which suffices for dissociation of the metallic and non-metallic elements of the ores and compounds named, substantially as and for the purpose specified.

13. In the art of smelting pyrites, sulphides, arsenide or antimonide compounds, zinc-blende and other ores, or artificial furnace products of a similar chemical nature, the method of keeping up the combustion and smelting without carbonaceous fuel in the charge, which consists in feeding them, mixed with lime or other similar substance, down in a column within a heated furnace, preventing said column from coming into contact with the furnace walls, by a layer of granular material not easily fusible, fed simultaneously with it, and subjecting the charge to a blast of air; all the while producing and maintaining a temperature in the smelting zone, sufficient to dissociate the metallic and non-metallic elements of these ores, &c., by introducing carbonaceous materials through the tuyeres and burning them, substantially as and for the purpose shown.

14. In the art of smelting pyrites, sulphides, arsenide or antimonide compounds, zinc-blende and other ores or artificial furnace products of a similar chemical nature, the method of keeping up the combustion and smelting without carbonaceous fuel in the charge; which consists in mixing them with a sufficient quantity of limestone, and feeding this mixture down in a column within a heated furnace, preventing said column from coming into contact with the sides of the furnace, by feeding simultaneously with it (between it and the furnace walls) a layer of material of a less easily fusible character than the central column, such column of ore or other compounds being mixed with limestone and together with the enveloping layer or zone of more or less silicious material, when they reach the smelting zone, being subjected to a blast of air, in the presence of a temperature sufficiently high to separate the metallic and non-metallic elements of the sulphides, arsenides and antimonides contained therein, which temperature is produced and maintained by the admission to the furnace, through the tuyeres or other suitable openings, of carbonaceous materials, care being taken to prevent the formation of accretions, consisting of ferric oxide or zinc compounds, in the lower parts of the furnace, by regulating the supply of these carbonaceous materials, substantially as and for the purpose indicated.

In testimony that I claim the foregoing I have hereunto set my hand this 26th day of March, 1894.

WILLIAM LAWRENCE AUSTIN.

Witnesses:
PHILIP ARGALL,
HENRY A. VEZIN.